United States Patent [19]

Marabotto et al.

[11] Patent Number: 4,714,439
[45] Date of Patent: Dec. 22, 1987

[54] ELECTRICAL CONNECTOR

[75] Inventors: Eduardo J. Marabotto, Miami; Mark S. Bresin, Coral Springs, both of Fla.; Bick R. Drake, Warren, Mich.

[73] Assignee: Motorola, Inc., Schaumburg, Ill.

[21] Appl. No.: 881,753

[22] Filed: Jul. 3, 1986

[51] Int. Cl.⁴ .................. H01R 13/24; H01R 13/52; H01M 2/26; H01M 10/38

[52] U.S. Cl. .................. 439/627; 429/121; 429/123; 439/271; 439/559

[58] Field of Search .......... 339/152, 94 M, 255 R; 429/121, 178, 181, 182, 183, 184, 1, 96, 97, 98, 99, 100, 123, 163; 439/627, 271, 272, 273, 277, 246, 247, 248, 819, 278, 559

[56] References Cited

U.S. PATENT DOCUMENTS

| | | | |
|---|---|---|---|
| 2,858,518 | 10/1958 | Chrystie et al. | 339/96 |
| 3,088,992 | 5/1963 | Lyman, Jr. | 429/100 |
| 3,519,975 | 7/1970 | Prow, Jr. et al. | 339/14 R |
| 3,796,984 | 3/1974 | Selinko | 339/152 |
| 4,011,368 | 3/1977 | Mabuchi | 429/121 |
| 4,083,011 | 4/1978 | Ferrell et al. | 339/152 |
| 4,129,688 | 12/1978 | Fischer et al. | 339/152 |
| 4,267,576 | 5/1981 | Power et al. | 339/241 |
| 4,578,628 | 3/1986 | Siwiak | 429/97 |
| 4,588,247 | 5/1986 | Grappe et al. | 339/255 R |

FOREIGN PATENT DOCUMENTS

| | | | |
|---|---|---|---|
| 58-34564 | 3/1983 | Japan . | |
| 402095 | 2/1974 | U.S.S.R. | 429/99 |

Primary Examiner—Gil Weidenfeld
Assistant Examiner—Gary F. Paumen
Attorney, Agent, or Firm—Daniel K. Nichols; Joseph T. Downey; Mark P. Kahler

[57] ABSTRACT

An electrical connector is provided for making electrical connection to a mating connector. The connector includes a body portion that has a substantially cylindrical cavity. A contact block is located in the cavity and carries three contacts. A spring engages the contact block for applying biasing force to the contact block and contacts for providing electrical connection of the contacts to the mating connector. A peripheral resilient seal is located above the contact block and provides a seal between the contact block and a cylindrical cavity. The peripheral seal includes a bead portion that engages the mating connector for providing a water seal about the contacts.

8 Claims, 2 Drawing Figures

ELECTRICAL CONNECTOR

BACKGROUND OF THE INVENTION

This invention relates to electrical connectors in general and in particular to electrical connectors having a self-leveling contact assembly and providing a water seal about the contacts.

In electrical connectors, such as those utilized in batteries for portable radios, it is necessary to make provisions for the mechanical biasing of the contacts to assure that electrical and mechanical connection is made to the mating contacts of the radio. This is necessary due to variations in the positions of contacts of the radio and serves to assure that the battery contacts will lie in the required plane fo connection. Consequently, a resilient means such as a spring arrangement is utilized with each individual battery contact to allow for variations in making electrical and mechanical connection.

It is also desirable to provide water seals about the contacts when the battery is mated to a radio. When using water sealed radios and water sealed batteries this allows the radio to be submersed without damage and prevents corrosion and galvanic action at the contacts. Typically, such seals are provided by the use of individual O rings about each contact. The reliability of such sealing approach is inversely proportional to the number of O ring seals utilized. Consequently, it would be desirable to provide a single seal arrangement for plurality of contacts on a radio battery.

SUMMARY OF THE INVENTION

This electrical connector, which provides a plurality of contacts, utilizes a single spring for biasing purposes, and includes a peripheral seal about the plurality of contacts.

The electrical connector for providing electrical connection to a mating connector comprises a body portion which includes a substantially cylindrical cavity. A plurality of electrical contacts are carried by a contact block. The contact block is located in the cavity and has a contact carrying surface with the contacts extending from the surface. Biasing means operatively engage the contact block for applying biasing force to the contact block and contacts for providing electrical connection of the contacts to the mating connector.

In one aspect of the invention, mechanical connecting means operatively selectively attach the connector to the mating connector.

In another aspect of the invention, a peripheral resilient seal is positioned about the contact block. The seal engages the cylindrical cavity for providing a water seal with the body portion while allowing movement of the contact block relative to the body portion.

In still another aspect of the invention, the peripheral seal includes a bead portion that is operatively engagable with the mating connector for providing a water seal about the contacts. In still another aspect of the invention, the connector includes three contacts having top portions which define a contact plane.

In yet another aspect of the invention, the top portions of the contacts are rounded. In still another aspect of the invention, retaining means operatively engage the contact block for preventing rotation of the contact block relative to the body portion.

DESCRIPTION OF THE PREFERRED EMBODIMENT

Figure 1:
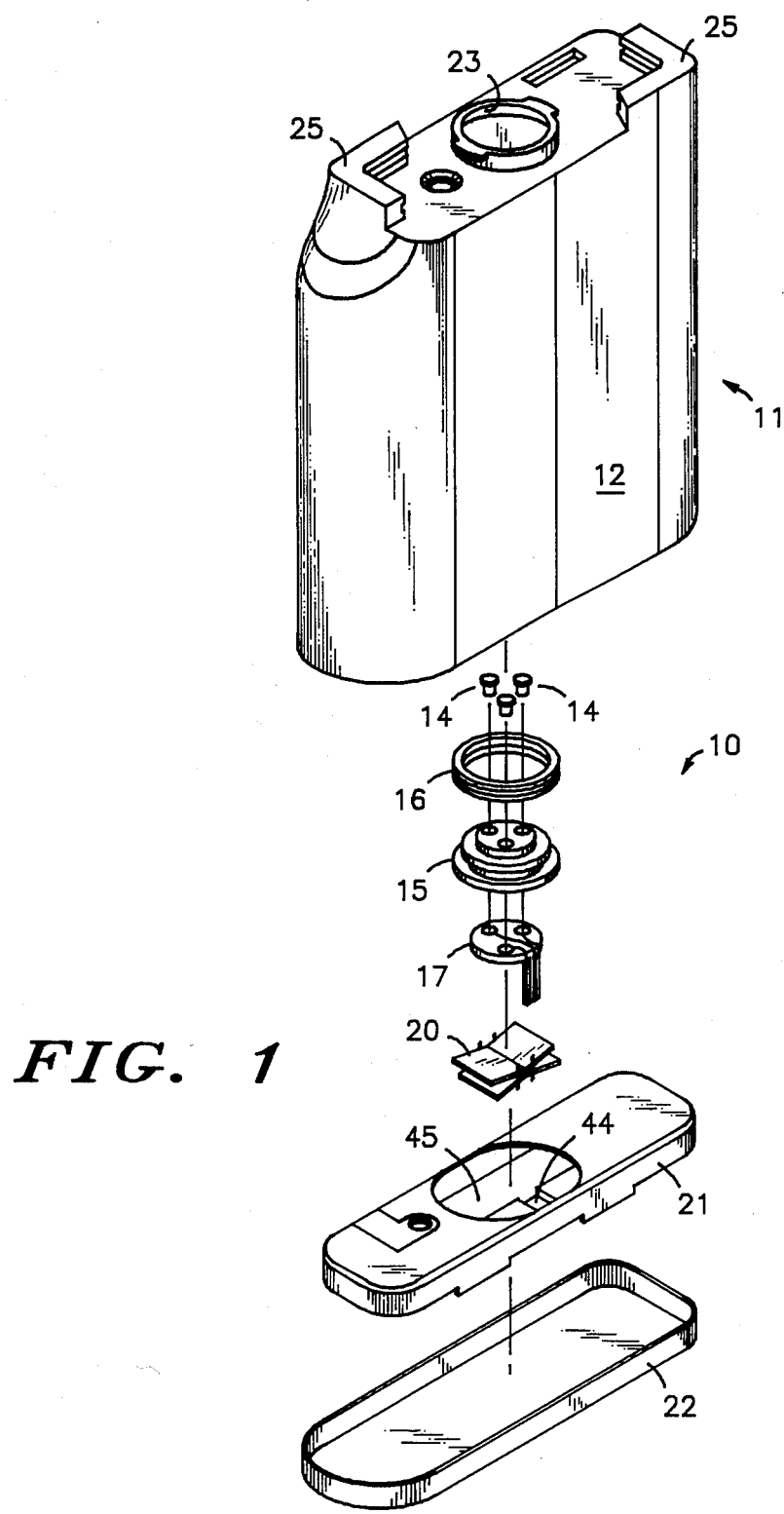
FIG. 1 is an exploded view of a battery housing having a connector of the preferred embodiment.

Referring now by characters of reference to the drawings and first to FIG. 1, it will be understood that the electrical connector indicated generally by 10 can be included with a battery indicated generally by 11. The battery 11 includes an outer housing 12 that conventionally contains a plurality of battery cells, not shown. The connector 10 includes a plurality of contact pins or contacts 14, comprising 3 pins in the preferred embodiment, that are carried by a contact block 15. A peripheral seal 16 of resiliently flexible material is located about the contact block 16. A flex circuit 17, constituting connecting means, is received within the contact block 15 for providing electrical connection between the contact pins 14 and the battery cells within the housing 11. A leaf spring 20, constituting biasing means, engages a lower side of the contact block and is carried by a header 21 which is received within the battery housing 12. A lower end battery cover 22 is provided for sealing the battery cover.

Figure 2:
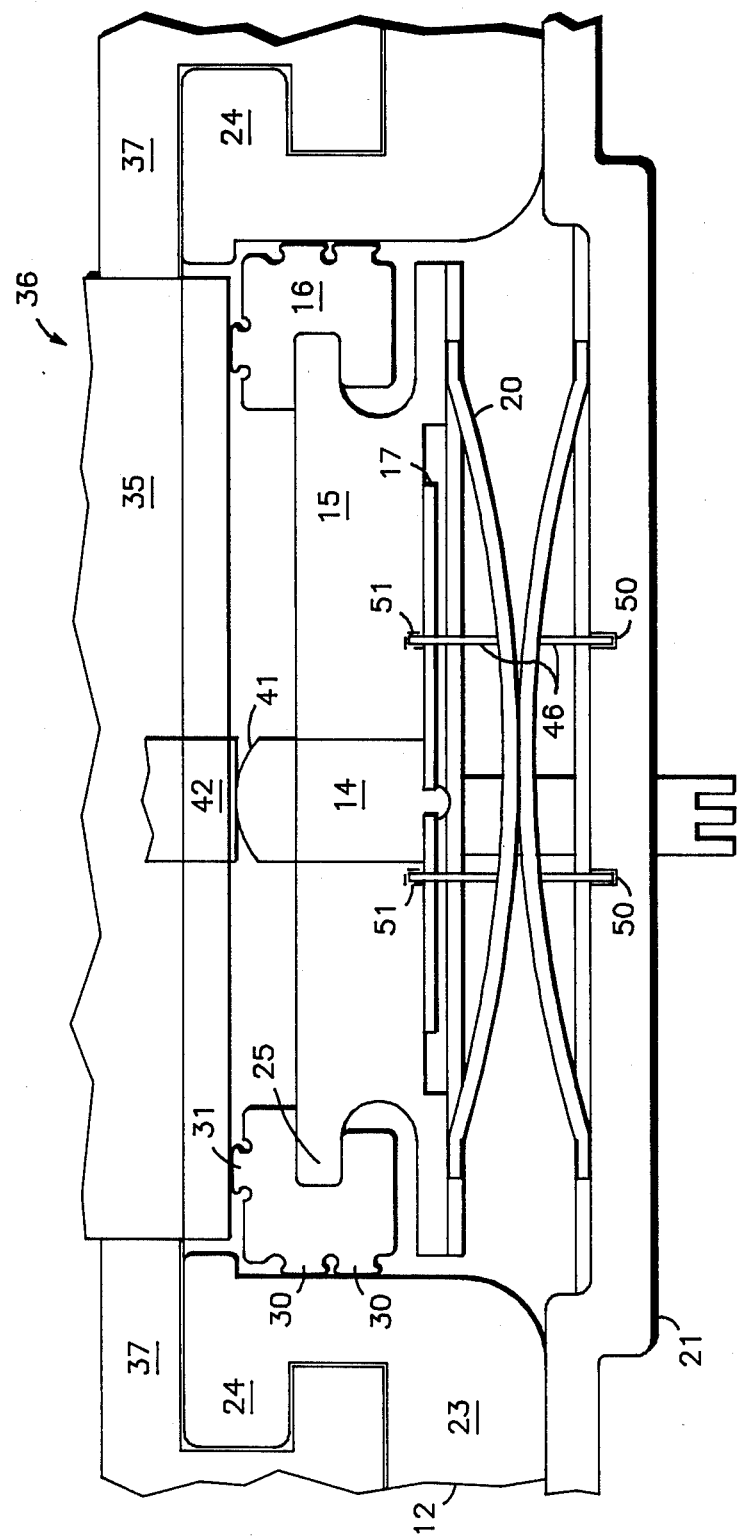
FIG. 2 is an enlarged fragmentary cross sectional view of the connector of FIG. 1.

As can be best seen in FIG. 2, the top of the battery housing 12 includes a cylindrical cavity portion 23 having upstanding side walls and opposed side tabs 24 that are utilized for making a bayonet type mechanical connection to mating radio 36 and which constitute mechanical connecting means. The top of the battery housing 12 also includes diagonally opposed corner flanges 25 that are designed for further mechanical locking of the battery 11 to the radio 36.

The contact block 15 and seal 16 are received within the battery cylindrical portion 23. The contact block 15 includes an upper peripheral lip 25 about which the seal 16 is received. The seal 16 includes two side beads 30 which sealingly engage the cylindrical portion 23. The seal 16 also includes an upper bead 31 that sealingly engages the mating connector 35 of the radio 36. The side tabs 24 are received by the base plate 37 of the radio 36. The cylindrical portion 23 includes an upper inturned lip portion 40 for retaining the seal 16 and contact block 15 within the cylindrical portion.

Each of the contacts 14 includes a rounded top portion 41 engagable with mating contacts 42 of the connector 35. It will be understood that the three contacts 14 are located at corners of an equilateral triangle and each contact 14 engages a mating contact 42 of connector 35.

The flex circuit 17 is received within the contact block 15 for electrical connection to the contacts 14. The contact pins 14 are formed to provide electrical and mechanical connection to circuit traces on the flex circuit 17. The flex circuit 17 extends to the side of spring 20 and down through a hole 44 in the header 21 for electrical connection to the battery cells.

The contact block 15 includes a slot 44 on its lower side that receives the spring 20. The header 21 also includes a slot 45 that receives the spring 20.

The spring 20 is formed of two spring portions welded at the center. A plurality of positioning pins 46 extend from the spring 20. Apertures 50 in the header 21 and apertures 51 in the contact block 15 receive the positioning pins 46 for providing retaining means for preventing rotation of the contact block 15 within the battery cylindrical portion 23.

It is thought that the structural features and the structural advantages of the electrical connector have become fully apparent from the foregoing description of parts, but for completeness of disclosure, a brief description of the operation and use of the connector will be given.

When mating with the radio 36, the battery 11 is first aligned with the radio so that the side tabs 24 will be properly received by the radio base plate 36 in bayonet fashion. As the battery 11 is pushed toward the radio 36, the radio connector 35 engages the connector 10 causing the contacts 14, contact block 15 and seal 16 to be forced downward against the biasing force of the spring 20. The battery 11 is then rotated relative to radio 36 to lock it into position. The positioning pins 46 assure that the contact block rotates with the battery 11 thereby preventing relative rotation of the contact block and the cylindrical portion 23.

As three contact pins 14 are provided, a connection or contact plane is defined and any irregularities in the plane of the contacts 42 of the connector 35 of the radio 36 can be accommodated. This is accomplished both by movement of the contact block 15 along the axis of the cylindrical portion 23 as well as by tilting about the axis. The tilting of the contact block 15 is provided by the spring 20 as well as the resiliency of the seal 16. The seal 16 slideably engages the cylindrical portion 23 when the contact block 15 moves along the axis of the cylindrical portion. Consequently, the contact pins 14 will each be biased into contact with the mating contacts 42 of the radio 36. The seal upper bead 31 engages the connector 35 to provide the seal about the contacts 14 and 42.

We claim as our invention:

1. An electrical connector for providing electrical connection between a battery located in a compartment of a battery housing, and a mating connector, said electrical connector comprising:

a body portion including a substantially cylindrical cavity, and adapted to be seated at one end of said compartment, a plurality of electrical contacts, a contact block located in said cavity and having a contact carrying surface with the plurality of said contacts extending from said surface, a peripheral resilient seal about the contact block, the seal being seated in said cylindrical cavity for providing a water seal with said body portion while allowing both logitudinal and tilting movement of the contact block relative to said body portion, and biasing means operatively engaging the contact block for applying a resilient biasing force to the contact block and the contacts for providing electrical connection of said contacts to said mating connector.

2. An electrical connector as defined in claim 1, further comprising mechanical connecting means for operatively selectively attaching the connector to said mating connector.

3. An electrical connector as defined in claim 1 in which the peripheral seal includes a bead portion operatively engagable with said mating connector for providing a water seal about said contacts.

4. An electrical connector as defined in claim 1 wherein:

said contacts include three contacts having top portions defining a contact plane.

5. An electrical connector as defined in claim 4 in which the top portions of said contacts are rounded.

6. An electrical connector as defined in claim 5 in which:

retaining means operatively engages the contact block for preventing rotation of said contact block relative to the body portion.

7. An electrical connector as defined in claim 1, in which said biasing means includes a leaf spring.

8. An electrical connector as defined in claim 7, in which the leaf spring includes a plurality of pins, said pins engaging said contact block and said body portion for preventing rotation of the contact block relative to the body portion.

* * * * *